(12) United States Patent
Kim et al.

(10) Patent No.: US 12,597,617 B2
(45) Date of Patent: Apr. 7, 2026

(54) FUEL CELL MEMBRANE HUMIDIFIER

(71) Applicant: KOLON INDUSTRIES, INC., Seoul (KR)

(72) Inventors: Do Woo Kim, Seoul (KR); Kyoung Ju Kim, Seoul (KR); Na Hyun Ahn, Seoul (KR); In Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 279 days.

(21) Appl. No.: 18/558,724

(22) PCT Filed: Jun. 9, 2022

(86) PCT No.: PCT/KR2022/008155
§ 371 (c)(1),
(2) Date: Nov. 2, 2023

(87) PCT Pub. No.: WO2022/265295
PCT Pub. Date: Dec. 22, 2022

(65) Prior Publication Data
US 2024/0243308 A1 Jul. 18, 2024

(30) Foreign Application Priority Data
Jun. 16, 2021 (KR) ........................ 10-2021-0078239

(51) Int. Cl.
H01M 8/04119 (2016.01)
B01D 63/02 (2006.01)
H01M 8/10 (2016.01)

(52) U.S. Cl.
CPC ........ H01M 8/04149 (2013.01); B01D 63/02 (2013.01); B01D 2313/025 (2013.01);
(Continued)

(58) Field of Classification Search
CPC ......... H01M 8/04119; H01M 8/04141; H01M 8/04149; H01M 2008/1095;
(Continued)

(56) References Cited

U.S. PATENT DOCUMENTS 7,624,971 B2 12/2009 Terasaki
2018/0316028 A1 11/2018 An
(Continued)

FOREIGN PATENT DOCUMENTS

JP H11130125 A 5/1999
JP 2007-046801 A 2/2007
(Continued)

OTHER PUBLICATIONS

EESR dated Mar. 19, 2025.
(Continued)

*Primary Examiner* — Robert Clemente
(74) *Attorney, Agent, or Firm* — Harvest IP Law, LLP

(57) ABSTRACT

The present disclosure relates to a fuel cell membrane humidifier in which a gap between an inner case and a mid-case constituting a cartridge is sealed to prevent off-gas from being bypassed. The disclosed fuel cell membrane humidifier includes: a mid-case having a partition wall partitioning an internal space; a first cap fastened to one side of the mid-case; a second cap fastened to other side of the mid-case; an inner case disposed in the mid-case and configured to accommodate a plurality of hollow fiber membranes therein; a rib protruding from one side of the inner case and coming into contact with one surface of the partition wall; a hook protruding from other side of the inner case and coming into contact with other surface of the partition wall; a first gasket disposed between the first cap and the inner case and configured to transmit fastening force between the first cap and the mid-case to the rib; and a second gasket disposed between the second cap and the inner case and configured to transmit fastening force between the second cap and the mid-case to the hook.

4 Claims, 5 Drawing Sheets

(52) U.S. Cl.
CPC .... *B01D 2313/041* (2022.08); *B01D 2313/20*
(2013.01); *H01M 2008/1095* (2013.01)

(58) Field of Classification Search
CPC .......... B01D 2313/02; B01D 2313/025; B01D
2313/041; B01D 2313/20; B01D 63/02;
B01D 63/021; B01D 63/022; B01D
63/033
See application file for complete search history.

(56)                        References Cited

U.S. PATENT DOCUMENTS

| | | | |
|---|---|---|---|
| 2021/0057767 A1 | 2/2021 | Kim | |
| 2021/0151780 A1 | 5/2021 | Kim | |
| 2022/0344684 A1* | 10/2022 | Ahn | ................... H01M 8/0438 |

FOREIGN PATENT DOCUMENTS

| | | | |
|---|---|---|---|
| JP | 2014-117651 | A | 6/2014 |
| KR | 10-2018-0119828 | A | 11/2018 |
| KR | 10-2019-0138528 | A | 12/2019 |
| KR | 10-2021-0067366 | A | 6/2021 |
| KR | 10-2021-0069614 | A | 6/2021 |
| KR | 10-2264517 | B1 | 6/2021 |
| WO | 2022/265298 | A1 | 12/2022 |

OTHER PUBLICATIONS

International Search Report dated Sep. 22, 2022.
Office Action from Korean Patent Office, dated Oct. 11, 2024.
JP OA dated Dec. 2, 2024.

* cited by examiner

FUEL CELL MEMBRANE HUMIDIFIER

CROSS REFERENCE TO RELATED APPLICATIONS

This application is a National Stage of International Application No. PCT/KR2022/008155 filed on Jun. 9, 2022, claiming priority based on Korean Patent Application No. 10-2021-0078239 filed on Jun. 16, 2021, the disclosure of which is incorporated herein by reference in its entirety.

TECHNICAL FIELD

The present disclosure relates to a fuel cell membrane humidifier, and more particularly, to a fuel cell membrane humidifier in which a gap between an inner case and a mid-case constituting a cartridge is sealed to prevent off-gas from being bypassed.

BACKGROUND ART

Fuel cells are power-generating cells that produce electricity by combining hydrogen with oxygen. Unlike general chemical cells such as dry cells or storage batteries, fuel cells are able to continuously produce electricity as long as hydrogen and oxygen are supplied, and have the advantage of being about twice as efficient as internal combustion engines because there is no heat loss.

In addition, fuel cells emit fewer pollutants because chemical energy generated by a combination of hydrogen and oxygen is directly converted into electrical energy. Therefore, fuel cells are environmentally friendly and have the advantage of reducing concerns about resource depletion due to increasing energy consumption.

Depending on the type of electrolyte used, such fuel cells may be mainly classified into polymer electrolyte membrane fuel cell (PEMFC), phosphoric acid fuel cell (PAFC), molten carbonate fuel cell (MCFC), solid oxide fuel cell (SOFC), and alkaline fuel cell (AFC).

Such fuel cells operate on the same fundamental principle, but differ in the type of fuel used, operating temperature, catalyst, electrolyte, etc. Among them, PEMFC operates at a lower temperature than other fuel cells and has high power density, allowing for miniaturization. Accordingly, PEMFC is known to be the most promising fuel cell not only in small-scale stationary power generation equipment but also in transportation systems.

One of the most important factors in improving the performance of PEMFC is to maintain moisture content by supplying more than a certain amount of moisture to a polymer electrolyte membrane (or a proton exchange membrane (PEM)) of a membrane electrode assembly (MEA). This is because when the polymer electrolyte membrane is dried, power generation efficiency is rapidly reduced.

There are several methods of humidifying the polymer electrolyte membrane, including 1) a bubbler humidification method of supplying moisture by passing target gas through a diffuser after filling a pressure-resistant vessel with water, 2) a direct injection method of supplying moisture directly to a gas flow pipe through a solenoid valve by calculating a required moisture supply for fuel cell reaction, and 3) a membrane humidifying method of supplying moisture to a gas fluid layer by using a polymer separation membrane.

Among them, the membrane humidifying method of humidifying the polymer electrolyte membrane by supplying water vapor to air to be supplied to the polymer electrolyte membrane by using a membrane that selectively allows only water vapor included in off-gas to pass therethrough is advantageous in that the membrane humidifier may be lightweight and miniaturized.

When the selective permeable membrane used in the membrane humidifying method is formed in a module, a hollow fiber membrane having a large permeable area per unit volume is preferable. In other words, when the membrane humidifier is manufactured by using the hollow fiber membrane, high integration of hollow fiber membrane with large contact surface area is possible, so it is possible to sufficiently humidify a fuel cell even with a small capacity, to use low-cost materials, and to recover moisture and heat contained in off-gas discharged from the fuel cell at a high temperature and thus reuse the recovered moisture and heat through the membrane humidifier.

FIG. 1 is an exploded perspective view illustrating a fuel cell membrane humidifier according to the related art, and FIG. 2 is a cross-sectional view for describing problems of the fuel cell membrane humidifier according to the related art.

Referring to FIGS. 1 and 2, a fuel cell membrane humidifier 10 of the related art includes a humidification module 11 in which moisture is exchanged between air supplied from the outside and off-gas discharged from a fuel cell stack (not shown), and caps 12 coupled to both ends of the humidification module 11.

One cap among the caps 12 is configured to supply, to the humidification module 11, air supplied from the outside, and another cap among the caps 12 is configured to supply, to the fuel cell stack, air humidified by the humidification module 11.

The humidification module 11 includes a mid-case 11a having an off-gas inlet 11b and an off-gas outlet 11c, and least one cartridge 20 disposed within the mid-case 11a. In the drawing, one cartridge is illustrated as an example. The cartridge 20 has an inner case 23. A plurality of hollow fiber membranes 21 and a potting portion 22 are formed inside the inner case 23. The potting portion 22 fixes both ends of a bundle of hollow fiber membranes 21. The potting portion 22 is generally formed by curing a liquid polymer, such as liquid polyurethane resin, through a casting method.

A resin layer 11e is formed between the cartridge 20 and the mid-case 11a. The resin layer 11e fixes the cartridge 20 to the mid-case 11a and blocks the internal spaces of the caps 12 and the internal space of the mid-case 11a.

An internal space of the mid-case 11a is partitioned into a first space S1 and a second space S2 by a partition wall 11d. The inner case 23 includes a first mesh hole portion MH1 arranged in a mesh form to allow fluid communication with the first space S1, and a second mesh hole portion MH2 arranged in a mesh form to allow fluid communication with the second space S2.

Off-gas flowing into the first space S1 of the mid-case 11a through the off-gas inlet 11b flows into the inner case 23 through the first mesh hole portion MH1 and then comes into contact with the outer surfaces of the hollow fiber membranes 21. Subsequently, the off-gas deprived of moisture exits to the second space S2 through the second mesh hole portion MH2 and is then discharged from the mid-case 11a through the off-gas outlet 11c. The cartridge 20 including the inner case 23 may be easily assembled with the mid-case 11a and may be easily replaced.

Referring to FIG. 2, the inner case 23 includes a rib 25 in contact with one surface of the partition wall 11d and a hook 24 in contact with the other surface of the partition wall 11d. The hook 24 has an inclined surface. When the cartridge 20 is inserted into the mid-case from left to right of the drawing in a state in which the cap 12 and the mid-case 11*a* are separated, the inclined surface of the hook 24 may be inserted between the partition walls in an interference fit manner while coming into contact with the partition wall 11*d*. Subsequently, the cartridge 20 is continuously inserted, and when the rib 25 comes into contact with the partition wall 11*d*, the cartridge 20 is no longer inserted and is fixed.

That is, the hook 24 and the rib 25 of the cartridge 20 are fixed to one surface and the other surface of the partition wall 11*d* with the partition wall 11*d* therebetween. Accordingly, the cartridge 20 may be fixed within the mid-case 11*a*.

In this case, the distance between the hook 24 and the rib 25 may be manufactured to be substantially the same as the width of the partition wall 11*d*. Otherwise, the off-gas introduced through the off-gas inlet 11*b* is discharged to the off-gas outlet 11*c* through a gap between the rib 25 and the partition wall 11*d* and a gap between the hook 24 and the partition wall 11*d*. In other words, off-gas to be used for humidification is bypassed and discharged to the outside without being used for humidification. (See symbol "BF" in FIG. 2)

However, due to misassembly or dimensional tolerance, the gap between the hook 24 and the rib 25 and the width of the partition wall 11*d* may become different from each other. Therefore, there is a problem in that bypassing off-gas is generated and humidification efficiency is reduced.

DISCLOSURE

Technical Problem

The object of the present disclosure is to provide a fuel cell membrane humidifier in which a gap between an inner case and a mid-case constituting a cartridge is sealed to prevent off-gas from being bypassed.

Technical Solution

A fuel cell membrane humidifier according to an embodiment of the present disclosure includes: a mid-case having a partition wall partitioning an internal space; a cap fastened to the mid-case; an inner case disposed in the mid-case and configured to accommodate a plurality of hollow fiber membranes therein; a rib protruding from one side of the inner case and coming into contact with one surface of the partition wall; and a gasket disposed between the cap and the inner case and having a first hardness, the gasket being configured to seal a gap between the inner case and the partition wall by transmitting fastening force between the cap and the mid-case to the rib.

In addition, a fuel cell membrane humidifier according to an embodiment of the present disclosure includes: a mid-case having a partition wall partitioning an internal space; a cap fastened to the mid-case; an inner case disposed in the mid-case and configured to accommodate a plurality of hollow fiber membranes therein; a hook protruding from other side of the inner case and coming into contact with other surface of the partition wall; and a gasket disposed between the cap and the inner case and having a second hardness, the gasket being configured to seal a gap between the inner case and the partition wall by transmitting fastening force between the cap and the mid-case to the hook.

In the fuel cell membrane humidifier according to an embodiment of the present disclosure, the gasket may include: an inner case interface where the gasket comes into contact with the inner case; a cap interface where the gasket comes into contact with the cap; and an insertion protrusion inserted between an end portion of the cap and an end portion of the mid-case.

In the fuel cell membrane humidifier according to an embodiment of the present disclosure, a bottom surface of the cap in contact with the cap interface may be formed to have a size corresponding to a size of the cap interface.

In the fuel cell membrane humidifier according to an embodiment of the present disclosure, the rib may have a closed curve shape surrounding an outer surface of the inner case.

In the fuel cell membrane humidifier according to an embodiment of the present disclosure, the hook may have a closed curve shape surrounding an outer surface of the inner case.

In addition, a fuel cell membrane humidifier according to an embodiment of the present disclosure includes: a mid-case having a partition wall partitioning an internal space; a first cap fastened to one side of the mid-case; a second cap fastened to other side of the mid-case; an inner case disposed in the mid-case and configured to accommodate a plurality of hollow fiber membranes therein; a rib protruding from one side of the inner case and coming into contact with one surface of the partition wall; a hook protruding from other side of the inner case and coming into contact with other surface of the partition wall; a first gasket disposed between the first cap and the inner case and configured to transmit fastening force between the first cap and the mid-case to the rib; and a second gasket disposed between the second cap and the inner case and configured to transmit fastening force between the second cap and the mid-case to the hook.

In the fuel cell membrane humidifier according to an embodiment of the present disclosure, the first gasket and the second gasket may have different hardnesses.

In the fuel cell membrane humidifier according to an embodiment of the present disclosure, when the rib has a closed curve shape surrounding an outer surface of the inner case and the hook does not have a closed curve shape, a hardness of the first gasket may be greater than a hardness of the second gasket.

In the fuel cell membrane humidifier according to an embodiment of the present disclosure, when the hook has a closed curve shape surrounding an outer surface of the inner case and the rib does not have a closed curve shape, a hardness of the second gasket may be greater than a hardness of the first gasket.

Advantageous Effects

According to an embodiment of the present disclosure, a gap between an inner case and a mid-case constituting a cartridge may be sealed to prevent off-gas from being bypassed.

MODE FOR INVENTION

The present disclosure may include various modifications and embodiments, and therefore, the present disclosure will be explained in detail by taking exemplary embodiments. However, this is not intended to limit the present disclosure to particular embodiments, and it should be understood that the present disclosure is intended to include all variations, equivalents, and substitutes falling within the spirit and scope of the present disclosure.

The terms as used herein are only used to describe particular embodiments, and are not intended to limit the present disclosure. The singular forms as used herein are intended to include the plural forms as well unless the context clearly indicates otherwise. It should be noted that the terms "comprise," "include," or "have" as used in the present application are inclusive and therefore specify the presence of stated features, integers, steps, operations, elements, components, or any combination thereof, but do not preclude the presence or addition of one or more other features, integers, steps, operations, elements, components, or any combination thereof. Hereinafter, a fuel cell membrane humidifier according to an embodiment of the present disclosure will be described with reference to the drawings.

Figure 1:
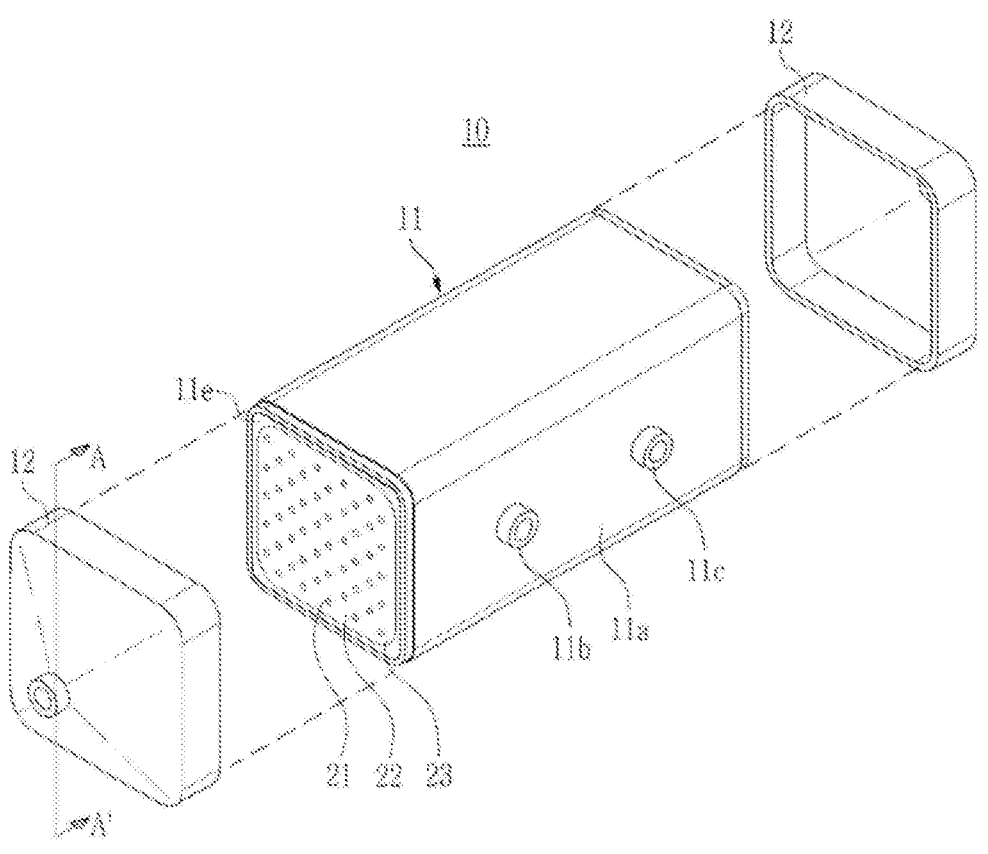
FIG. 1 is an exploded perspective view illustrating a fuel cell membrane humidifier according to the related art.
Figure 2:
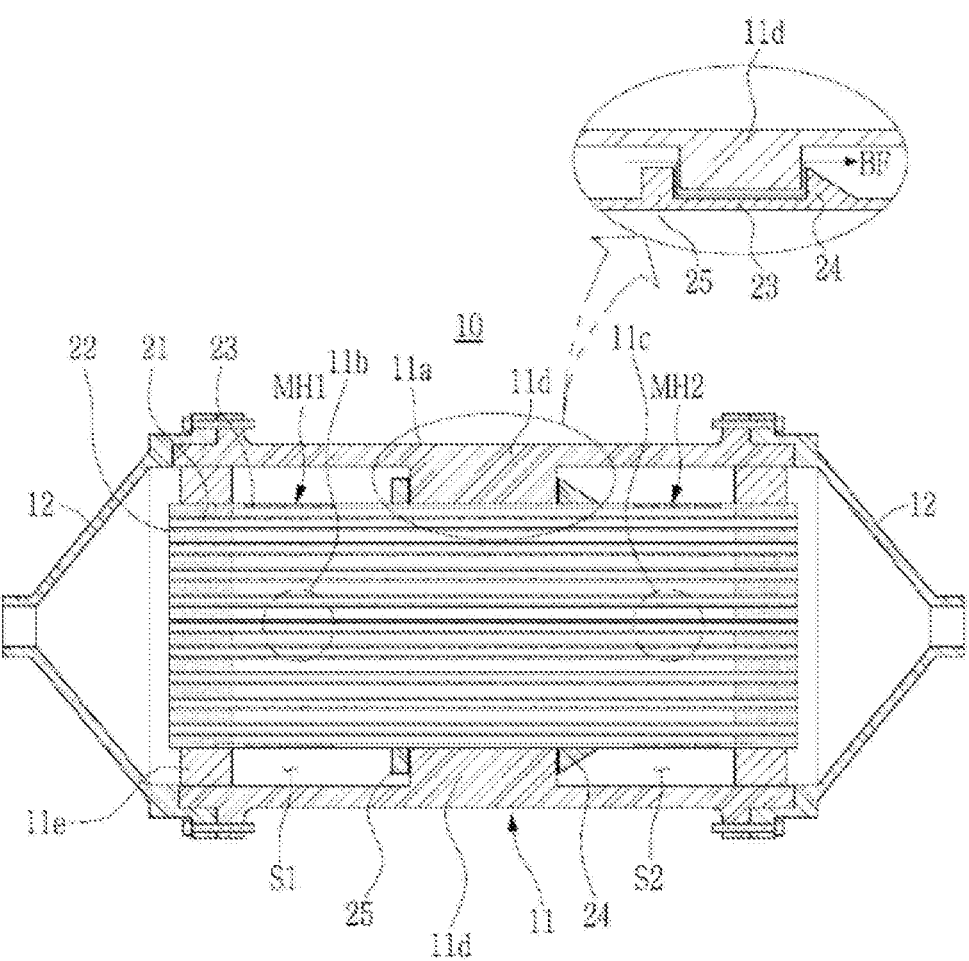
FIG. 2 is a cross-sectional view for describing problems of the fuel cell membrane humidifier according to the related art.
Figure 3:
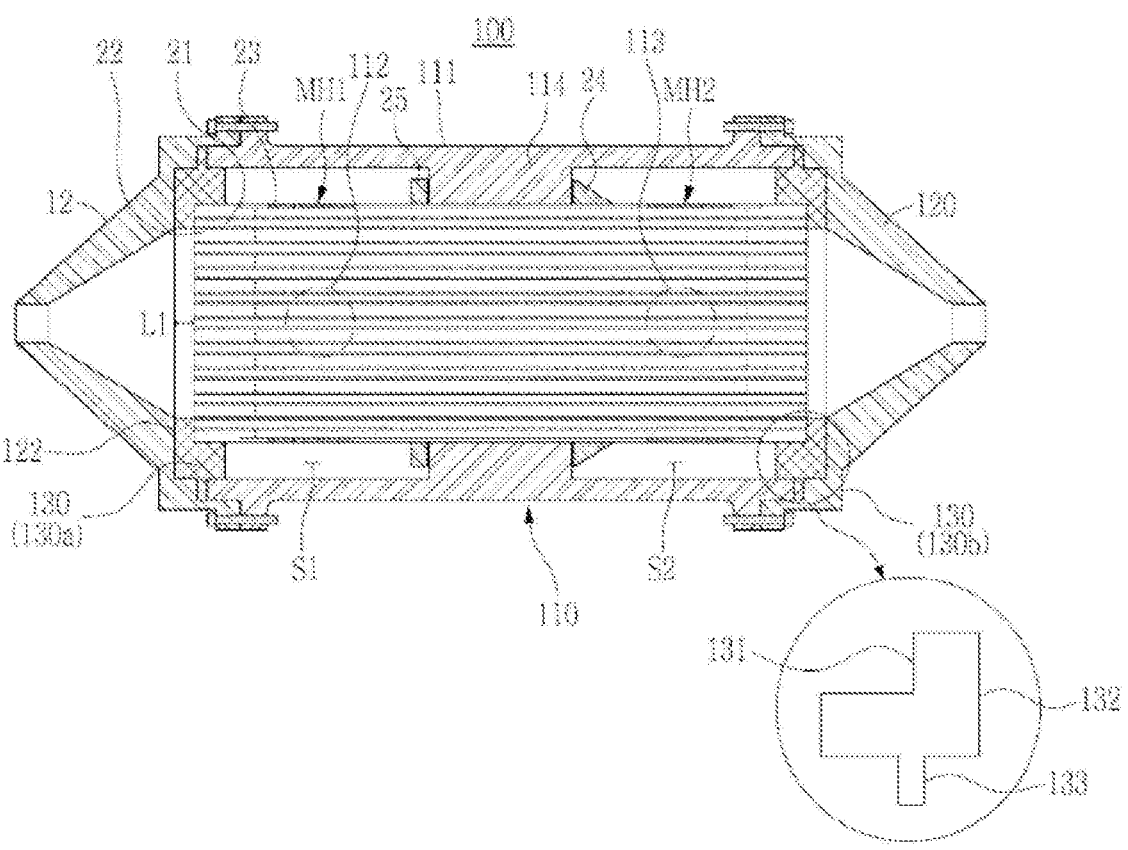
FIG. 3 is a cross-sectional view illustrating a fuel cell membrane humidifier according to an embodiment of the present disclosure.
Figure 4:
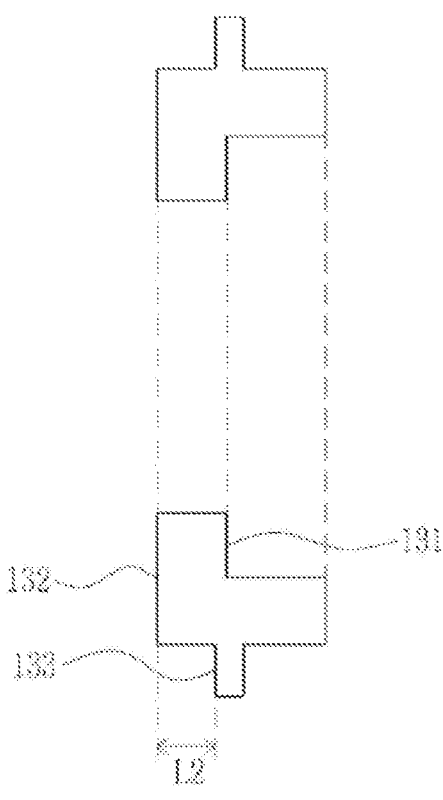
FIG. 4 is a cross-sectional view of a gasket according to an embodiment of the present disclosure.
Figure 5:
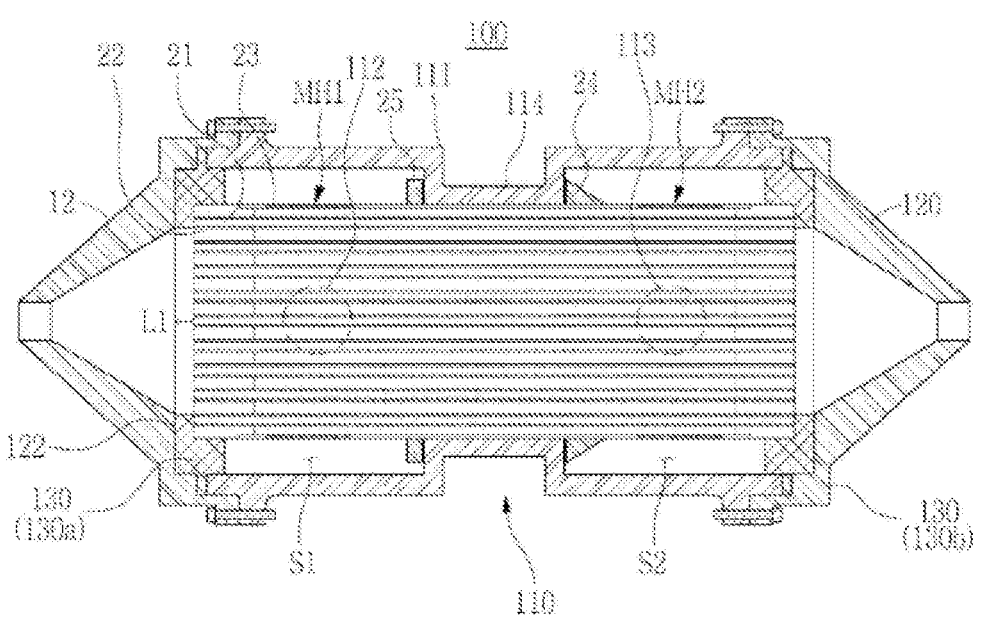
FIG. 5 is a cross-sectional view illustrating a partition wall implemented in a different form in the fuel cell membrane humidifier according to an embodiment of the present disclosure.

FIG. 3 is a cross-sectional view illustrating a fuel cell membrane humidifier according to an embodiment of the present disclosure, FIG. 4 is a cross-sectional view of a gasket according to an embodiment of the present disclosure, and FIG. 5 is a cross-sectional view illustrating a partition wall implemented in a different form in the fuel cell membrane humidifier according to an embodiment of the present disclosure.

As illustrated in FIG. 3, a fuel cell membrane humidifier 100 according to an embodiment of the present disclosure includes a humidification module 110, caps 120, and a gasket 130.

The humidification module 110 performs moisture exchange between air supplied from the outside and off-gas discharged from a fuel cell stack (not shown). The caps 120 are coupled to both ends of the humidification module 110. One cap among the caps 120 supplies, to the humidification module 110, air supplied from the outside, and another cap among the caps 12 supplies, to the fuel cell stack, air humidified by the humidification module 110.

The humidification module 110 includes a mid-case 111 having an off-gas inlet 112 and an off-gas outlet 113, and at least one cartridge 20 disposed in the mid-case 111.

Of course, depending on the design, one cap among the caps 120 may allow off-gas to be supplied to the humidification module 110 so that the off-gas flows inside a hollow fiber membrane, and the other cap among the caps 120 may allow moisture-exchanged off-gas to be discharged to the outside. In addition, in this case, external air may be introduced through either the off-gas inlet 112 or the off-gas outlet 113, and air humidified by the humidification module 110 may be supplied to the fuel cell stack through the remaining one among the off-gas inlet 112 and the off-gas outlet 113. A flow direction of the external air may be the same as or opposite to a flow direction of the off-gas.

The mid-case 111 and the caps 120 may be each independently formed of a hard plastic or metal, and may each have a circular or polygonal cross-section in a width direction. The "circular" includes oval, and the "polygonal" includes a polygon with rounded corners. For example, the hard plastic may be polycarbonate, polyamide (PA), polyphthalamide (PPA), polypropylene (PP), or the like. An internal space of the mid-case 111 may be partitioned into a first space S1 and a second space S2 by a partition wall 114.

The cartridge 20 may include a plurality of hollow fiber membranes 21, a potting portion 22, an inner case 23, a hook 24, and a rib 25.

The hollow fiber membrane 21 may include polysulfone resin, polyethersulfone resin, sulfonated polysulfone resin, polyvinylidene fluoride (PVDF) resin, polyacrylonitrile (PAN) resin, polyimide resin, polyamideimide resin, polyesterimide resin, or a polymer film formed of a mixture of at least two selected therefrom.

The potting portion 22 fixes ends of the hollow fiber membrane 21. The potting portion 22 may be formed by curing a liquid resin such as liquid polyurethane resin by a casting method such as deep potting or centrifugal potting.

The inner case 23 has an opening at each end, and the hollow fiber membranes 21 are accommodated in the opening. The potting portion 22 in which the end portions of the hollow fiber membranes 21 are potted closes the openings of the inner case 23. The inner case 23 includes a first mesh hole portion MH1 arranged in a mesh form to allow fluid communication with the first space S1, and a second mesh hole portion MH2 arranged in a mesh form to allow fluid communication with the second space S2.

Off-gas flowing into the first space S1 of the mid-case 111 through the off-gas inlet 112 flows into the inner case 23 through the first mesh hole portion MH1 and then comes into contact with the outer surfaces of the hollow fiber membranes 21. Subsequently, the off-gas deprived of moisture exits to the second space S2 through the second mesh hole portion MH2 and is then discharged from the mid-case 111 through the off-gas outlet 113.

The gasket 130 is installed between the cap 120 and the cartridge 20. Specifically, the gasket 130 is pressed by the cap 120 and installed between the cap 120 and the inner case 23 constituting the cartridge 20. A gasket 130a transmits fastening force between the cap 120 and the mid-case 111 to the rib 25, so that the rib 25 seals the gap between the inner case 23 and the partition wall 114.

Similarly, a gasket 130b transmits fastening force between the cap 120 and the mid-case 111 to the hook 24, so that the hook 24 seals the gap between the inner case 23 and the partition wall 114.

The following description focuses on sealing by the rib 25, but does not exclude the case of sealing by the hook 24. Whether the hook 24 or the rib 25 seals the gap may be determined according to the shape of the hook 24 or the rib 25. When the rib 25 has a closed curve shape surrounding the outer surface of the inner case 23, the rib 25 may seal the gap, and when the hook 24 has a closed curve shape surrounding the outer surface of the inner case 23, the hook 24 may seal the gap.

The gasket 130 may have an inner case interface 131, a cap interface 132, and an insertion protrusion 133, and may be formed in a single closed curve shape, as illustrated in FIG. 4.

The inner case interface 131 is a surface where the gasket 130 comes into contact with the inner case 23, and may have a single closed curve shape corresponding to the cross-sectional shape of the inner case 23. The cap interface 132 is a surface where the gasket 130 comes into contact with the cap 120, and may have a single closed curve shape corresponding to the cross-sectional shape of the cap 120. When the insertion protrusion 133 is inserted between the end portion of the cap 120 and the end portion of the mid-case 111 to fasten and assemble the cap 120 and the mid-case 111, the insertion protrusion 133 is pressed to seal the internal space of the cap 120 and the internal space of the mid-case 111.

The gasket 130 is formed of a rubber or plastic material with a certain hardness. Accordingly, when the gasket 130 is disposed between the cap 120 and the inner case 23 and the cap 120 is fastened to the mid-case 111 by using a bolt and a nut, the gasket 130 may be compressed by pressure applied by the cap 120 and the mid-case 111 and may transmit fastening force between the cap 120 and the mid-case 111 to the inner case 23 and the rib 25 protruding from one side of the inner case.

The rib 25 receives fastening force (pressure or repulsion force due to compression) the gasket 130 receives through the inner case 23 and applies force toward the partition wall 114. Therefore, even when there is a dimensional tolerance during manufacturing, the rib 25 may seal the gap between the inner case 23 and the partition wall 114. As a result, off-gas may be prevented from bypassing through the gap. The "dimensional tolerance" may be used to mean including all cases where the gap between the hook 24 and the rib 25 and the width of the partition wall 114 become different from each other during the manufacturing process.

In order to more effectively transmit fastening force, the bottom surface 122 of the cap 120 in contact with the cap interface 132 may be formed to have a size corresponding to a size of the cap interface 132.

Even when the first gasket 130*a* on the rib 25 side and the second gasket 130*b* on the hook 24 side are formed with the same hardness and the same dimensions, fastening force received by the gasket 130 may be transmitted to the rib 25. However, because the second gasket 130*b* on the hook 24 side also transmits fastening force to the hook 24, there is a risk that fastening forces on both sides may be canceled.

Accordingly, in the present disclosure, the first gasket 130*a* on the rib 25 side and the second gasket 130*b* on the hook 24 side may have different hardnesses. The hardness of the first gasket 130*a* on the rib 25 side is referred to as first hardness, and the hardness of the second gasket 130*b* on the hook 24 side is referred to as second hardness.

Referring to FIG. 3 again, considering the membrane humidifier assembly sequence, first, the right cap 120 is fastened to the mid-case 111. At this time, the second gasket 130*b* is inserted into the right cap 120 and the mid-case 111. Thereafter, the cartridge 20 is inserted into the mid-case 111. At this time, the hook 24 having the inclined surface is inserted first and the rib 25 is inserted later. The hook 24 and the rib 25 are fixed to one side and the other side of the partition wall 114 with the partition wall 114 therebetween. Next, after the first gasket 130*a* is disposed on the end portions of the inner case 23 and the mid-case 111, the left cap 120 is fastened to the mid-case 111. At this time, fastening force between the left cap 120 and the mid-case 111 is transmitted to the rib 25. In addition, at this time, fastening force between the right cap 120 and the mid-case 111 is transmitted to the hook 24.

In this situation, when the first gasket 130*a* disposed on the rib 25 side and having the first hardness and the second gasket 130*b* disposed on the hook 24 side and having the second hardness have different hardnesses, that is, when the first hardness and the second hardness are different from each other, fastening force of either the first gasket 130*a* or the second gasket 130*b* becomes more dominant, and thus, one of the rib 25 and the hook 24 may seal the gap between the inner case 23 and the partition wall 114.

In addition, the first gasket 130*a* and the second gasket 130*b* have different hardnesses, and the magnitude of the hardness may be determined according to the shapes of the hook 24 or the rib 25.

When the rib 25 has a closed curve shape surrounding the outer surface of the inner case 23, the rib 25 may seal the gap between the inner case 23 and the partition wall 114, and thus, the hardness of the first gasket 130*a* on the rib 25 side is preferably greater than the hardness of the second gasket 130*b* on the hook 24 side.

Similarly, when the hook 24 has a closed curve shape surrounding the outer surface of the inner case 23, the hook 24 may seal the gap between the inner case 23 and the partition wall 114, and thus, the second gasket 130*b* on the hook 24 side preferably has a greater hardness.

When both the hook 24 and the rib 25 have a closed curve shape surrounding the outer surface of the inner case 23, it is sufficient for the first gasket 130*a* and the second gasket 130*b* to have different hardnesses.

Depending on the design, the partition wall 114 may be formed to have a shape illustrated in FIG. 5. Referring to FIG. 5, the partition wall 114 may be formed to have a shape in which the central portion of the mid-case 111 is recessed inward.

While the embodiments of the present disclosure have been described, it will be understood by those of ordinary skill in the art that various modifications and changes may be made therein through inclusion, alteration, removal or addition of elements without departing from the spirit and scope of the present disclosure as defined by the following claims. Furthermore, it will be understood that this also falls within the scope of the present disclosure.

EXPLANATION OF REFERENCE NUMERALS
DESIGNATING THE MAJOR ELEMENTS OF
THE DRAWINGS

100: fuel cell membrane humidifier
110: humidification module
111: mid-case
112: off-gas inlet
113: off-gas outlet
114: partition wall
120: cap
130: gasket
20: cartridge

The invention claimed is:

1. A fuel cell membrane humidifier comprising:
a mid-case having a partition wall partitioning an internal space;
a first cap fastened to one side of the mid-case;
a second cap fastened to other side of the mid-case;
an inner case disposed in the mid-case and configured to accommodate a plurality of hollow fiber membranes therein;
a rib protruding from one side of the inner case and coming into contact with one surface of the partition wall;
a hook protruding from other side of the inner case and coming into contact with other surface of the partition wall;
a first gasket disposed between the first cap and the inner case and configured to transmit fastening force between the first cap and the mid-case to the rib; and a second gasket disposed between the second cap and the inner case and configured to transmit fastening force between the second cap and the mid-case to the hook.

2. The fuel cell membrane humidifier of claim 1, wherein the first gasket and the second gasket have different hardnesses.

3. The fuel cell membrane humidifier of claim 1, wherein, when the rib has a closed curve shape surrounding an outer surface of the inner case and the hook does not have a closed curve shape, a hardness of the first gasket is greater than a hardness of the second gasket.

4. The fuel cell membrane humidifier of claim 1, wherein, when the hook has a closed curve shape surrounding an outer surface of the inner case and the rib does not have a closed curve shape, a hardness of the second gasket is greater than a hardness of the first gasket.

\* \* \* \* \*